(12) United States Patent
Petter et al.

(10) Patent No.: US 7,492,617 B2
(45) Date of Patent: *Feb. 17, 2009

(54) FREQUENCY CONTROL AND POWER BALANCING IN DISTURBED POWER INVERTER SYSTEM AND METHOD THEREOF

(75) Inventors: Jeffrey K. Petter, Williston, VT (US); Belvin Sewell Freeman, Moretown, VT (US)

(73) Assignee: Northern Power Systems, Inc., Barre, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/770,155

(22) Filed: Jun. 28, 2007

(65) Prior Publication Data

US 2008/0002442 A1    Jan. 3, 2008

Related U.S. Application Data

(63) Continuation of application No. 11/170,687, filed on Jun. 29, 2005, now Pat. No. 7,333,352.

(51) Int. Cl.
  H02M 1/12   (2006.01)
(52) U.S. Cl. .......................................... 363/41; 363/98
(58) Field of Classification Search ......... 323/207–208, 323/283, 267; 363/71, 131; 327/513, 427; 327/157, 359; 455/251.1, 252.1, 260, 118, 455/307
See application file for complete search history.

(56) References Cited

U.S. PATENT DOCUMENTS

| | | | |
|---|---|---|---|
| 4,246,546 A | 1/1981 | McDonald | |
| 4,447,792 A | 5/1984 | Wynn | |
| 4,866,402 A | 9/1989 | Black | |
| 5,548,504 A | 8/1996 | Takehara | |
| 6,104,102 A | 8/2000 | Tsuji | |
| 6,157,262 A | 12/2000 | Fienhage | |
| 6,246,595 B1 | 6/2001 | Larsen | |
| 6,304,006 B1 | 10/2001 | Jungreis | |
| 6,693,409 B2 * | 2/2004 | Lynch et al. | 323/208 |
| 6,791,850 B2 | 9/2004 | Pai | |
| 6,963,248 B2 * | 11/2005 | Ward et al. | 331/18 |

* cited by examiner

Primary Examiner—Rajnikant B Patel
(74) Attorney, Agent, or Firm—Downs Rachlin Martin PLLC; Cantor Colburn, LLP

(57) ABSTRACT

A system and method are disclosed for controlling DC to AC power converters (inverters) that are operated as voltage sources and are paralleled on the AC side. This method allows for controlling frequency while sharing real power. The disclosed method requires no communication between inverters for proper load sharing, thus enhancing reliability of a system of parallel inverters. The only signals required for control are the AC voltage and frequency and their reaction to the inverter output current. The present invention allows a multiplicity of inverters or active rectifiers to share power in relation to their share of the available power capacity of the system. This makes it possible to parallel DG sources with various response times while they are connected to either a utility grid or in a stand-alone power network with no communications required between inverters. The addition of communications to the system allows the dispatch of energy for economic reasons and to fine tune load balance. Communications can be used for systems status and maintenance but is not required for reliable short-term operation.

17 Claims, 7 Drawing Sheets

FREQUENCY CONTROL AND POWER BALANCING IN DISTURBED POWER INVERTER SYSTEM AND METHOD THEREOF

CROSS REFERENCE TO RELATED APPLICATIONS

This application is a continuation of U.S. patent application Ser. No. 11/170,687 filed on Jun. 29, 2005 now U.S. Pat. No. 7,333,352 which is incorporated by reference in its entirety.

FIELD OF INVENTION

This disclosure relates generally to electronic power inverter and especially to a power inverter with frequency control and power balancing features in a disturbed power inverter system with application to distributed generation and demand side management.

BACKGROUND OF INVENTION

Many new types of distributed generation and energy storage products are currently being developed. These devices include, but are not limited to: fuel cells, flywheels, advanced batteries, micro-turbines, Stirling engines, wind turbines, solar cells and double-layer capacitors. Each one of these devices requires a power electronic inverter at its output to make useable AC power, typically 50 or 60 Hz single or three-phase power.

The simplest model of parallel power converters on an AC grid consists of two single-phase AC voltage sources 10, 12 operating at about the same frequency connected to each other through an inductance 14, 16 as shown in FIG. 1. If both AC sources are at the same frequency, phase, and amplitude, there will be no current flowing between the sources, as well as no power flow. A slight phase shift in either source will cause real power to flow from the leading source to the lagging source. If the amplitude is changed for either source, reactive power will then flow from the higher amplitude source to the lower amplitude source. Now, if we add a resistive load 18 between the two generators 10, 12 we can visualize a more realistic AC power system. As the load 18 is increased (i.e., draws more current), there will be a phase shift between the load and the AC voltage sources. If the sources are perfect voltage sources (i.e., having no power limits or output impedance), this will work well and adjusting the phase relationship can control the relative power from each source.

When the two sources are a synchronous type generator such as one driven by an internal combustion engine, the system reacts differently. When the load draws more power, the frequency of each generator will drop until a control system for the engine fuel system increases the engine output to bring the system power back into balance. In this situation the power and frequency balances need to be controlled. Both sources are trying to provide the correct frequency and speed. There are many traditional solutions to this problem. If the machines are near each other or there is high-speed communications between the machines, one master controller can schedule and control the fuel to each machine. Another method, called isochronous control, couples the output power sense and control signal through a set of signals in such way to make the machines balance power. Both of these methods require high-speed communications or actual control wires between generators to control system power balance and frequency.

Another method that does not use communications and is used frequently is frequency droop control. In this method each generator in a system has a frequency power schedule so that when the frequency is low they make more power and when the frequency is high they make less power. This way the power outputs are balanced on a per unit basis for the connected generators if the frequency droop factor is the same for each machine in proportion to its size. The frequency range needed for this type of control depends on the accuracy with which the absolute frequency can be determined by each controller. The frequency can vary as much as +/−3 Hz when using this method with small rotating machines. These basic concepts are used to control power systems of many synchronous generators throughout utility power networks.

When controlling parallel inverters, one solution is to use the same droop control methods used in synchronous generators. This is achieved by controlling real power or real current of the inverter in proportion to the frequency error. This has the same effect as the synchronous generator control described above. A typical inverter control system is shown in FIG. 2. It should be noted that the frequency error signal from the phase locked loop 20 (PLL) goes to the power command signal of the inverter controller 22.

Typically a second order PLL is used for this application. The second order PLL 20 provides very little phase error at any frequency of operation at steady state. Sometimes a first order PLL is used but this has a phase error, which is a function of frequency. This phase error can be set to zero at any frequency by using the offset center frequency as shown in FIG. 3.

It is considered advantageous to provide a distributed power inverter which could be applied to loads with active power converter front ends. In this way, certain dispatchable loads could help improve system power and frequency control allowing better use of available generation capacity by reducing the need for reserve power (spinning reserve).

Also, it is considered advantageous to provide uninterruptible power supply (UPS) systems that consist of multiple devices operating together to provide the required systems functions, including operating in parallel both connected to and isolated from the utility grid to provide uninterrupted power to the connected loads.

SUMMARY OF THE INVENTION

A power control system including an inverter and inductive member connecting the inverter to an AC power network. An inverter control system, wherein the inverter control system includes a phase locked loop, whereby the input of the phase locked loop is the voltage at the AC power network side of the inverter and the output of the phase locked loop is a sine wave corresponding to the desired fundamental value and phase at the output of said inverter. The phase locked loop may further include a transfer function providing a phase shift of 0.5 to 500 degrees per Hz during nearly steady operation, said transfer function being selected to provide a smaller phase shift when the output phase angle changes suddenly. In the preferred embodiment, the phase shift occurs when the output phase angle changes in less than 0.1 seconds.

A method of controlling power output from a control system, includes the steps of obtaining a phase error signal that represents the difference between the inverter and grid/load voltages. Generating a frequency error signal that is a function of the phase error signal, wherein said phase error signal and frequency error signals are voltage signals. Adjusting the phase error signal via a feedback loop that includes a phase shift and filter of the frequency error signal. Adjusting the frequency of the inverter by the use of the frequency error signal and filtering the phase shift signal from a conventional phase-locked loop so as to generate a filtered phase shifted signal and generating said frequency error signal as a function of said filtered phase shifted signal.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DETAILED DESCRIPTION OF THE INVENTION

Figure 1:
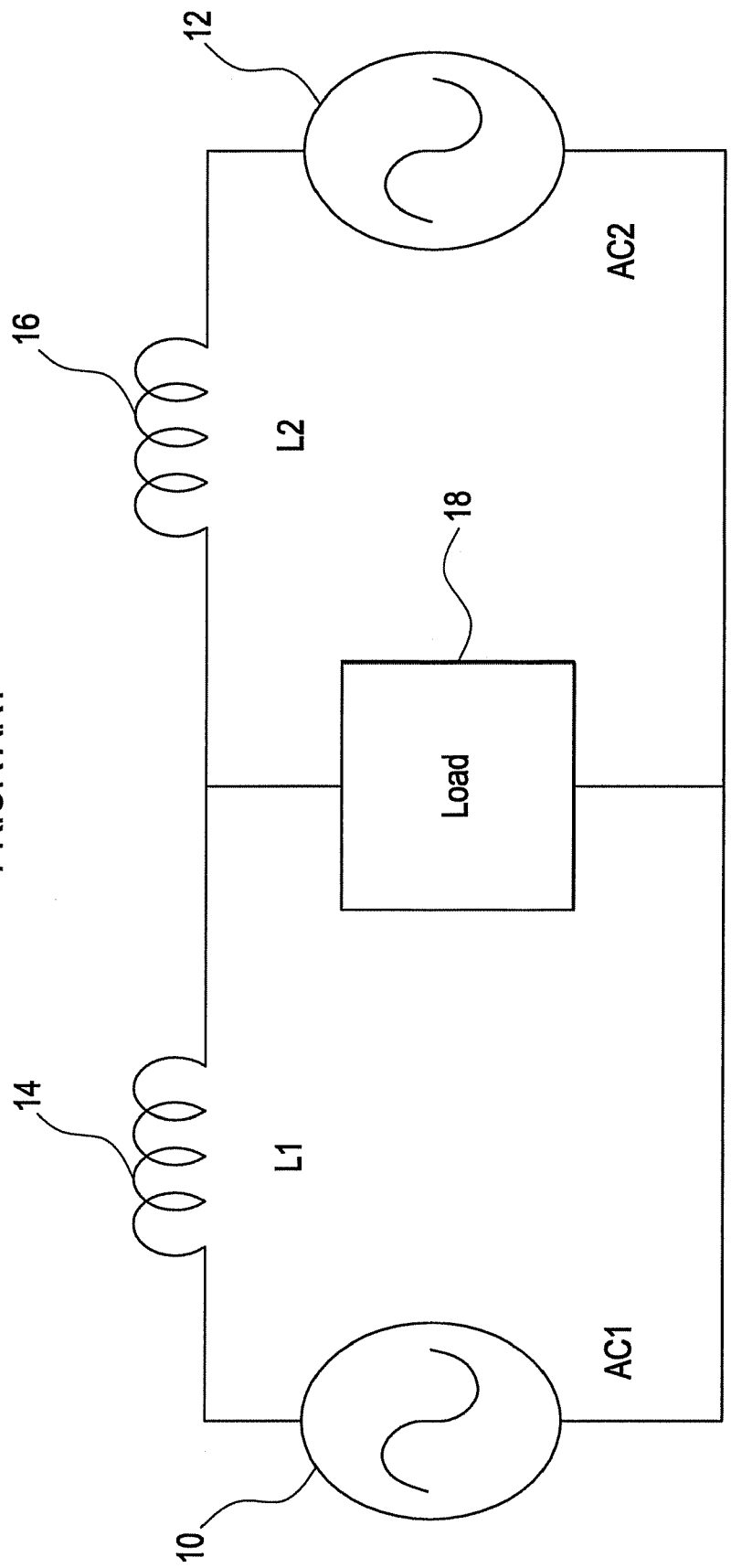
FIG. 1 is a diagram of a simplified prior art AC power system including multiple sources.
Figure 2:
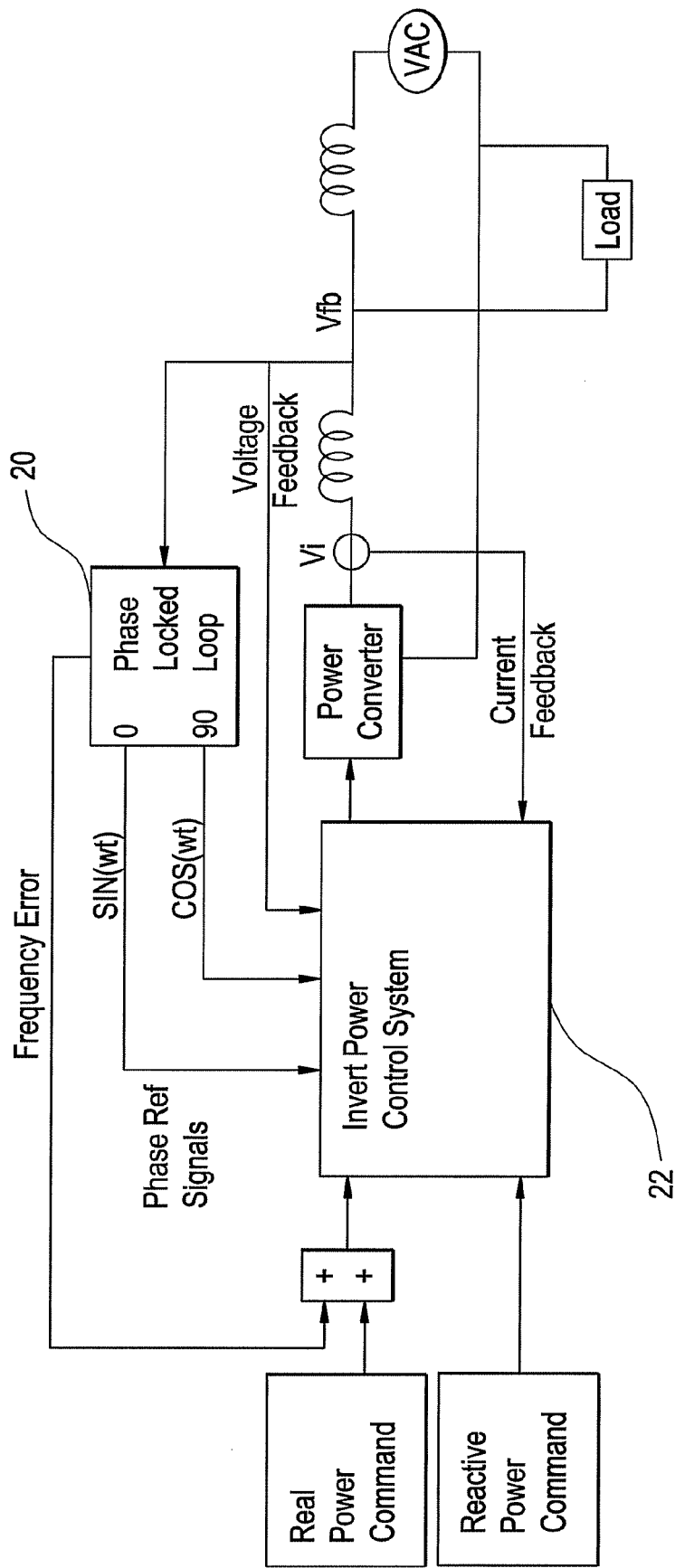
FIG. 2 is a schematic diagram of a prior art Single Phase Control System know in the prior art.
Figure 3:
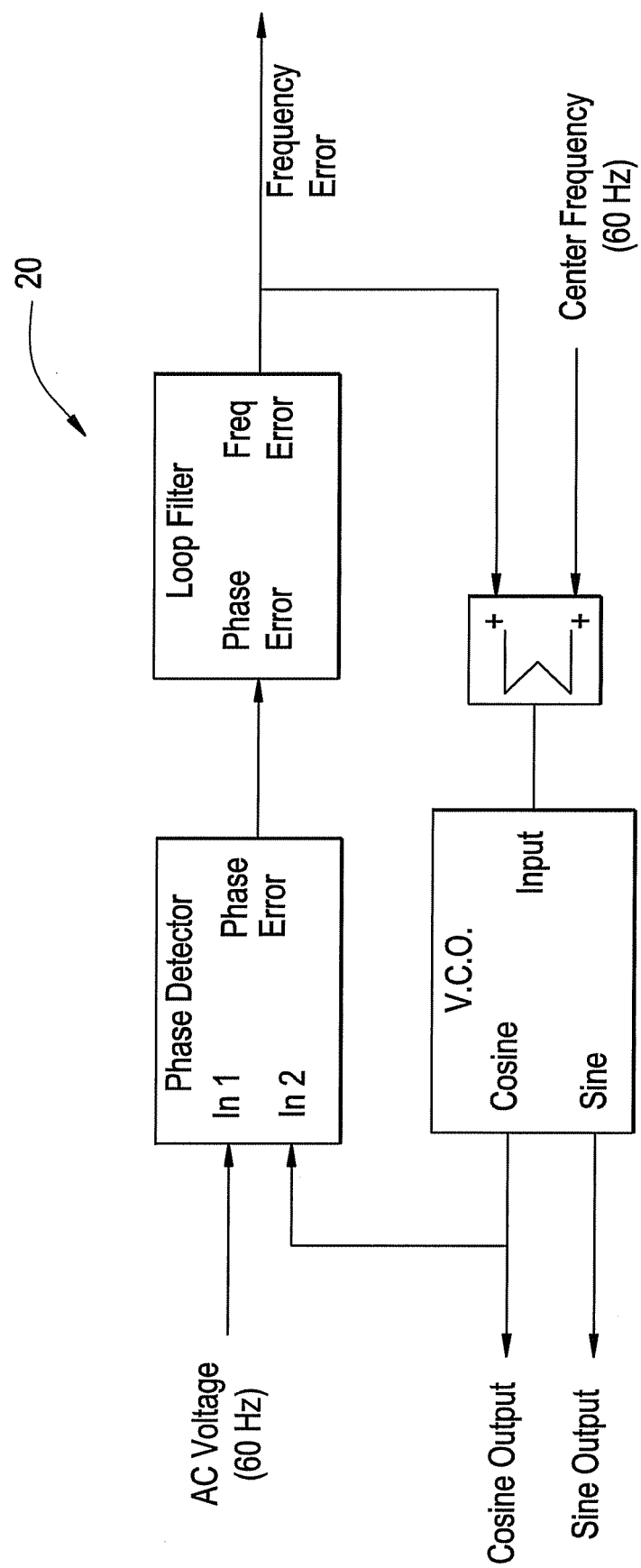
FIG. 3 is a schematic diagram of a prior art phase locked loop ("PLL")
Figure 4:
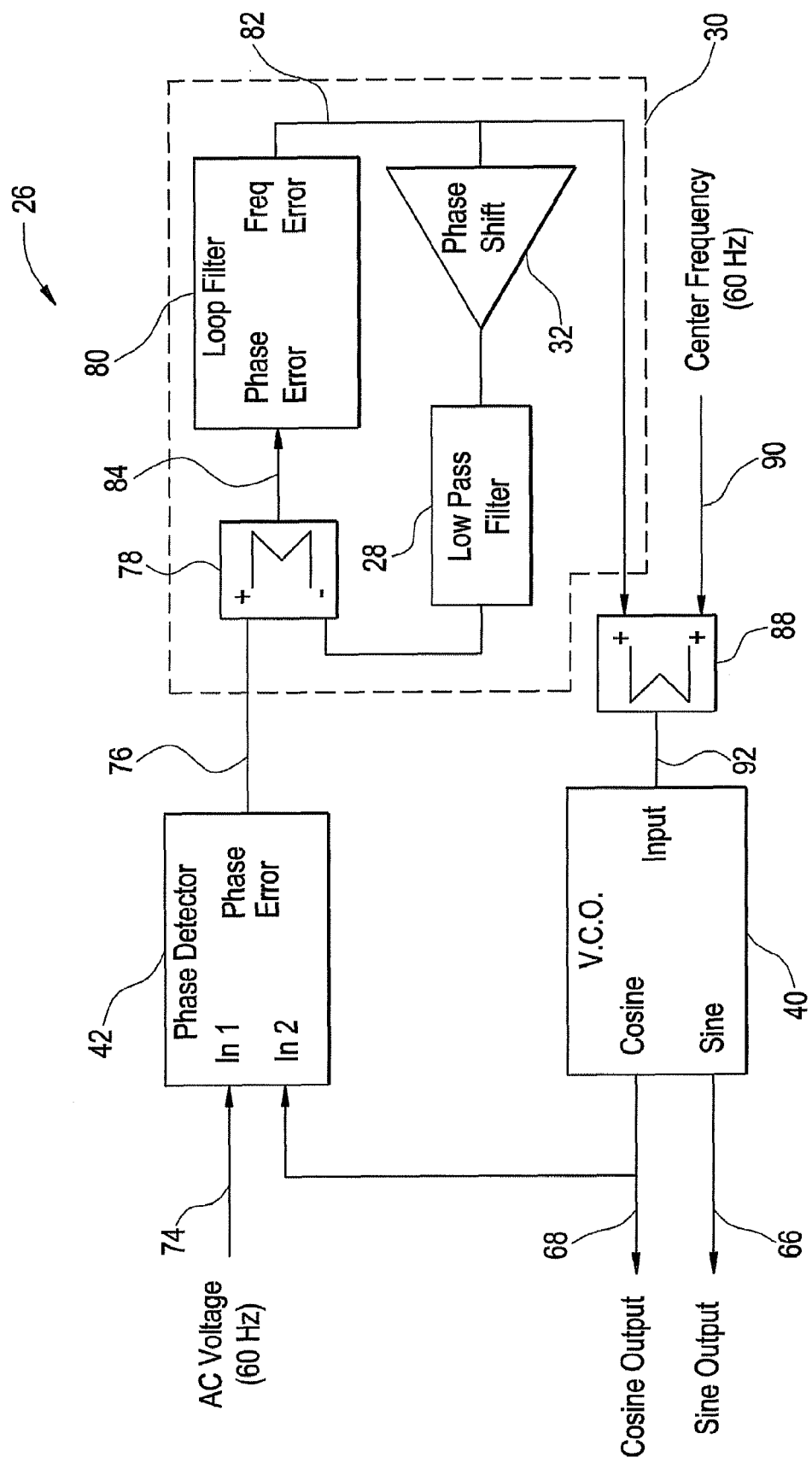
FIG. 4 is a schematic diagram of a PLL of the present invention.
Figure 6:
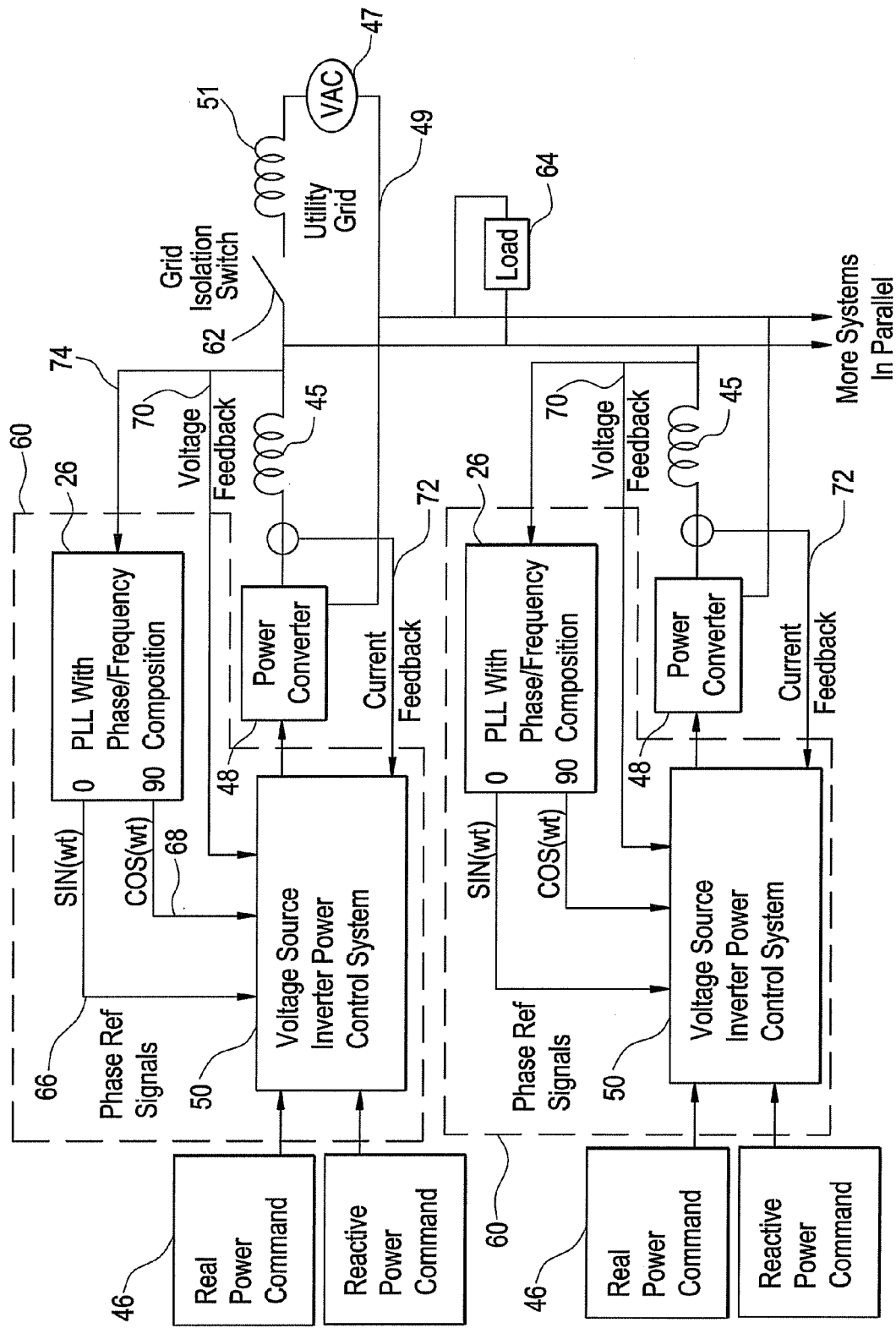
FIG. 6 is a schematic diagram of the PLL of the present invention in a power inverter application.

Referring to FIG. 4 and FIG. 6, a system for connecting to an electrical grid and controlling a power inverter is shown. The system 43 includes at least one AC electrical power source 47 that is connected to an electrical grid 49 having an inductance 51. A plurality of power inverters 48 are connected to the electrical grid 49 through an inductor 45. The electrical grid 49 may be a conventional utility grid, or an isolated power network. It should be appreciated that the invention disclosed herein is applicable to either a single phase or a three phase electrical system. The electrical grid 49 may optionally include a isolation switch 62 that removes the load 64 and power inverters 48 from the power source 47.

Each power inverter 48 is operated by a control system 60. The inverter control system 60 includes a controller 50 that provides the control algorithms and commands to the power inverter 48. In the preferred embodiment, the controller 50 implements the control code in a digital signal processor. Alternatively the controller 50 may be an analog circuit. The controller 50 receives input signals 66, 68 from a phase lock loop circuit 26 in addition to a voltage 70 and current 72 feedback signals. The controller 50 may be the same as that described in U.S. Pat. No. 6,693,409 issued Feb. 17, 2004 entitled "Control System For a Power Converter and Method of Controlling Operation of a Power Converter" which is incorporated herein by reference in its entirety for all relevant purposes.

The phase lock loop (PLL) circuit 26 is shown in more detail in FIG. 4. The PLL 26 receives a signal 74 representative of the electrical grid 49 voltage into a phase detector circuit 42. The phase detector 42 combines the voltage signal 49 with the cosine output signal 68 to generate a phase error signal 76. The phase error signal 76 is transmitted to feedback circuit 30.

The feedback circuit 30 includes a summation circuit 78 that is electrically coupled and provides input to a loop filter 80. The loop filter 80 outputs a frequency error signal 82 that is input into a phase shift circuit 32 and low pass filter 28. As will be described in more detail herein below, the phase shift and low pass filter signal 86 is input into the summation circuit 78 to provide a feedback loop that adjusts the phase error signal 84 received by the loop filter 80.

The frequency error signal 82 is provided to the input of summation circuit 88 where it is combined with a center frequency signal 90. The center frequency signal 90 is generated by operator selection software (not shown) and preferably matches the AC electrical frequency of the electrical grid 49. The output of the summation circuit 88 is received by a voltage controlled oscillator 40 (VCO). The input signal 90 is used by the VCO 40 to provide a repeating sine 66 and cosine 68 waveform signals that utilized by the controller 50 to provide phase and frequency compensation.

The present invention makes it possible to connect any number of power inverters 48 in parallel to the same AC power grid 49 without requiring inter-unit communication for real power and frequency stability. When the PLL 26 in the inverter control system 60 is operated in this manner, the parallel inverters 48 balance power and frequency control. This control is provided both when the inverters 48 are connected to the utility grid and when isolated from a prime mover such as a generator. When connected to a stiff frequency controlled system like a utility grid 49, the inverters 48 track frequency, and power can be controlled to any amount desired.

When the parallel inverters 48 are connected to a soft or uncontrolled frequency source, the inverters 48 will balance power and track frequency and keep the frequency near the center frequency (typically 50 or 60 Hz). This control method achieves the same effect as the frequency droop control used in synchronous generators, but is much easier to implement in an electronic power converter than traditional methods that base power commands on frequency error.

In the preferred embodiment a series inductor 45 is included on the output of the inverter 48. This allows the real power is controlled by controlling the phase shift across the inductor 45. Therefore the control can be implemented in a feed forward manner, which provides enhanced response to changes and stability with some compromise in the precision of the frequency droop factor due to inductor tolerance.

As discussed above, in the preferred embodiment a feed forward control method used. Therefore, the traditional feedback from the frequency to the power command can be used in conjunction with the present invention. This will provide the system both improved response and stability, as well as accuracy, while compromising on complexity. In addition, this method can work on the load side of a system by adjusting the power drawn by a load based on efficiency. This is possible for loads 64 that have active converter front ends. Active power converter front-end systems are unusual, but may become more common as power electronics becomes lower cost and the technology advances.

As discussed above, the PLL 26 effectively controls the phase error relative to the frequency error independent of the PLL compensation and low pass filter. It should be appreciated that the reference input signal 74 for the PLL 26 is from the grid 49 side of the inductor 45, and the output 66, 68 of the PLL 26 controls the voltage and current phases of the inverter 48 side of the inductor 45. In the preferred embodiment, the PLL 26 is a second order PLL. The low pass filter 28 is included in the feedback circuit 40 so that the transient stability and the tracking bandwidth of the PLL 26 is not changed by the feedback gain. This will make the PLL 26 have a transfer function that tracks fast changes in frequency or phase but allows a small amount of phase error to build to balance power when the frequency begins to drift. The PLL 26 described herein may be considered a hybrid between a first order PLL and second order PLL. At high frequencies the PLL 26 behaves like a second order PLL with high gain, and at low frequencies the PLL 26 behaves like a first order PLL with low gain. It should be noted that this embodiment of the present invention includes the phase shift 32 and low pass filter 28 applied to either a first or second order PLL for this application. This provides the PLL 26 control loop low gain at low frequencies to control sharing and high gain at high frequencies to improve dynamic tracking. Typical traditional PLLs are designed with the highest possible gain at all frequencies to obtain good tracking and low phase errors. In the preferred embodiment, DC phase errors are allowed to improve power sharing. It should be appreciated that the low pass filter 28 is optional, but is desirable to improve the performance of the PLL 26. In addition, alternative filters may be used in place of the low pass filter.

In operation, in order for the AC power source 47 to send real power into a grid, the phase of the voltage output has to shift to lead the grid voltage due to the inductive nature of the grid impedance 51. In prior art inverter control systems, this was accomplished by implementing a current control loop that responds to a current command generated from a reference waveform that is derived from the grid voltage. In this prior art system, the action of the current control loop will force the output voltage at the terminal of the inverter to be as required so that the output current will match the desired current waveform (template). Then a frequency error signal is used to set the level of real current commanded to the grid in order to maintain frequency sharing and stability (droop control) to the grid. The present invention provides at least two differences from the prior art system. First, the input voltage reference 74 (Vfb) for the PLL 26 comes from the grid 49 or load side of the inductor 45 but the inverter 48 output is connected to the opposite side of the inductor 45. Second, in the preferred embodiment, there is no current waveform used for frequency control. The PLL 26 shifts the voltage reference waveforms in phase to shift the voltage across the output inductor 45. This action forces real current through the output inductor 45 which then goes into the electrical grid 49. By making the phase shift a function of frequency within the PLL 26 the present invention effectively performs the equivalent of droop control right in the PLL 26 without requiring the external current control loop.

These differences result in a number of advantages, including: 1) less computational power is required in the control processor to perform the droop function; 2) the frequency vs power droop performance is not as sensitive to the other control systems in the inverter, specifically the current and power controllers; 3) this method is much less sensitive to error due the known filtering features of a phase locked loop, the frequency signal of the PLL is very stable and well filtered making for stable noiseless power flow; and 4) the response of an inverter system using the present invention to power and frequency fluctuations will naturally scale the output impedance on the inverter, meaning if the output impedance on the inverter is the same per unit then the per unit droop will also scale.

Figure 5:
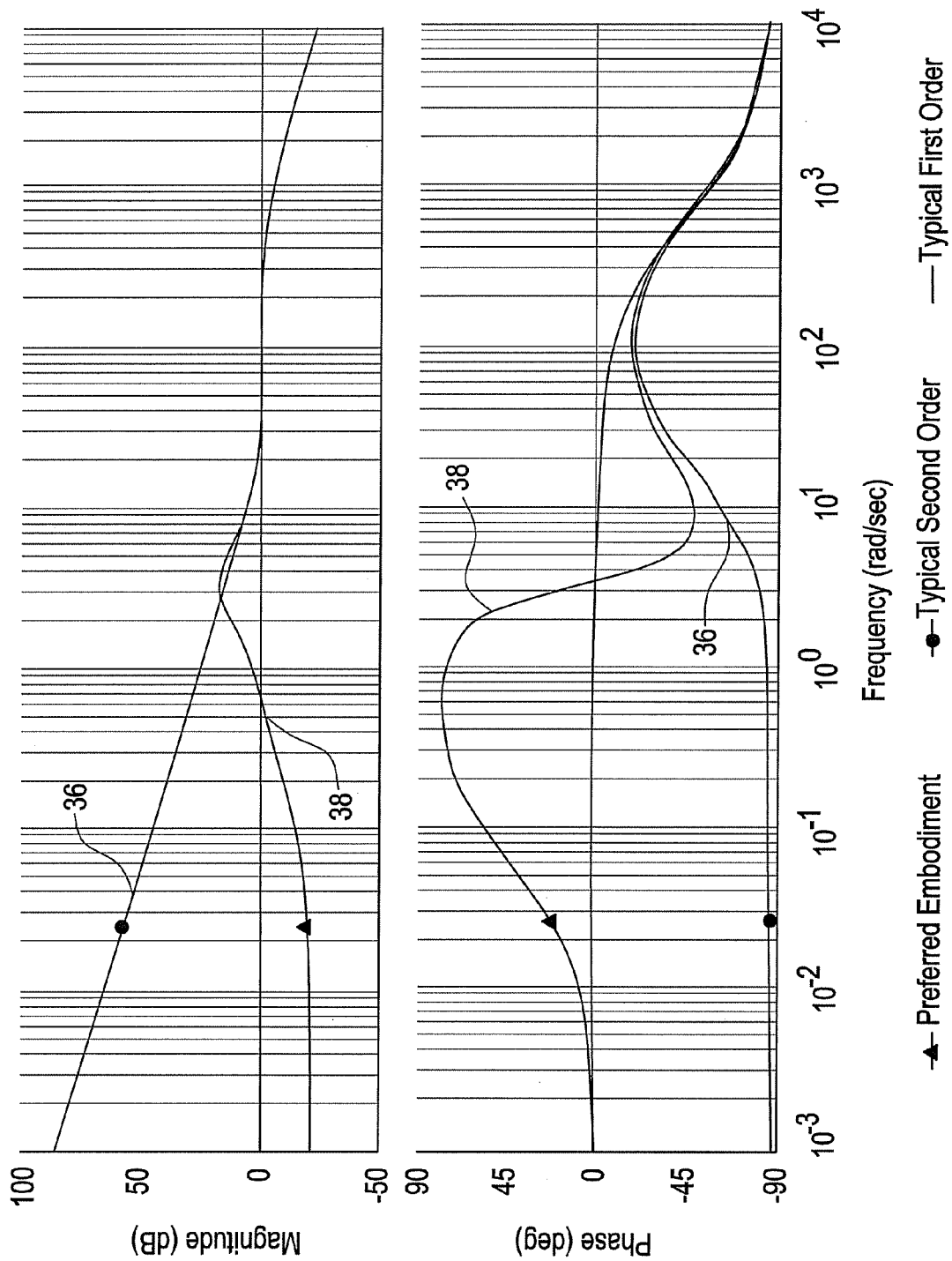
FIG. 5 is a Bode Plot of loop compensation of the present invention.

Referring to FIG. 5, the frequency response of a prior art second order PLL loop compensation 36 and the compensation 38 of the present invention are shown. It should be appreciated that the phase of the present invention's filter transitions from the response of the first order system at low frequencies to the second order system at higher frequencies. Since the transfer function of the combination of the VCO 40 and the phase detector 42 make an integrator for the remainder of the PLL 26 open loop response, therefore the PLL 26 will be stable for situations where the gain bandwidth product of this integrator is about 100 radians/sec (15.9 Hz).

It should be appreciated that the teachings of the present invention can be applied to any type of power inverters operating in parallel with a grid or other inverters. The teachings of the present invention also apply to any type of frequency and phase detection system including any type of phase locked loop.

Referring to FIG. 6, the PLL 26 of the present invention is shown. The PLL 26 provides a constant phase shift versus frequency error. The value of this phase shift per Hz (Kp) will be in the range of 0.5 degree per Hz to 500 degrees per Hz depending on the output inductance of the inverter and the desired frequency control.

The value of Kp is given by:

$$K_p = \frac{\operatorname{Sin}^{-1}(L_{pu})}{\Delta f}$$

Where Lpu is:

$$Lpu = \frac{2 \cdot \pi \cdot F \cdot L \cdot P_r}{V^2}$$

And for small L (less than 10% per unit):

$$\operatorname{Sin}^{-1}(L_{pu}) \approx Lpu$$

Therefore:

$$K_p \cong \frac{Lpu}{\Delta f} = \frac{2 \cdot \pi \cdot F \cdot L \cdot P_r}{V^2 \cdot \Delta f}$$

Where:
$P_r$ is the inverter rated power;
L is the output inductance;
$L_{pu}$ is the output inductance per unit;
V is the nominal voltage of the power system;
F is the nominal power system frequency (typically 50 or 60 Hz);
$\Delta f$ is the frequency deviation at rated power; and
Kp is the phase shift gain in degrees or radians per Hz.

If the same Kp is used in each PLL 26 and the output inductors 45 are sized the same on a per unit basis, then all the inverters 48 in parallel will share power in proportion to their rating. The value of Kp can be used to control which inverter 48 provides the most power when operating in islanded mode. For example: if one inverter 48 has a higher Kp than others, it will tend to take more of the power changes in the system 43 first. When this inverter 48 reaches its output limits the others will then share the additional power.

An alternate embodiment for a plurality of parallel power converters is use a power bias in conjunction with of droop control. In this way a source can have a bias of a certain amount of power over or under the other converters in the system rather than by simply a fraction of the rating as when different units have different values for Kp. The power bias is simply the real power commands 46 shown in FIG. 6.

Figure 7:
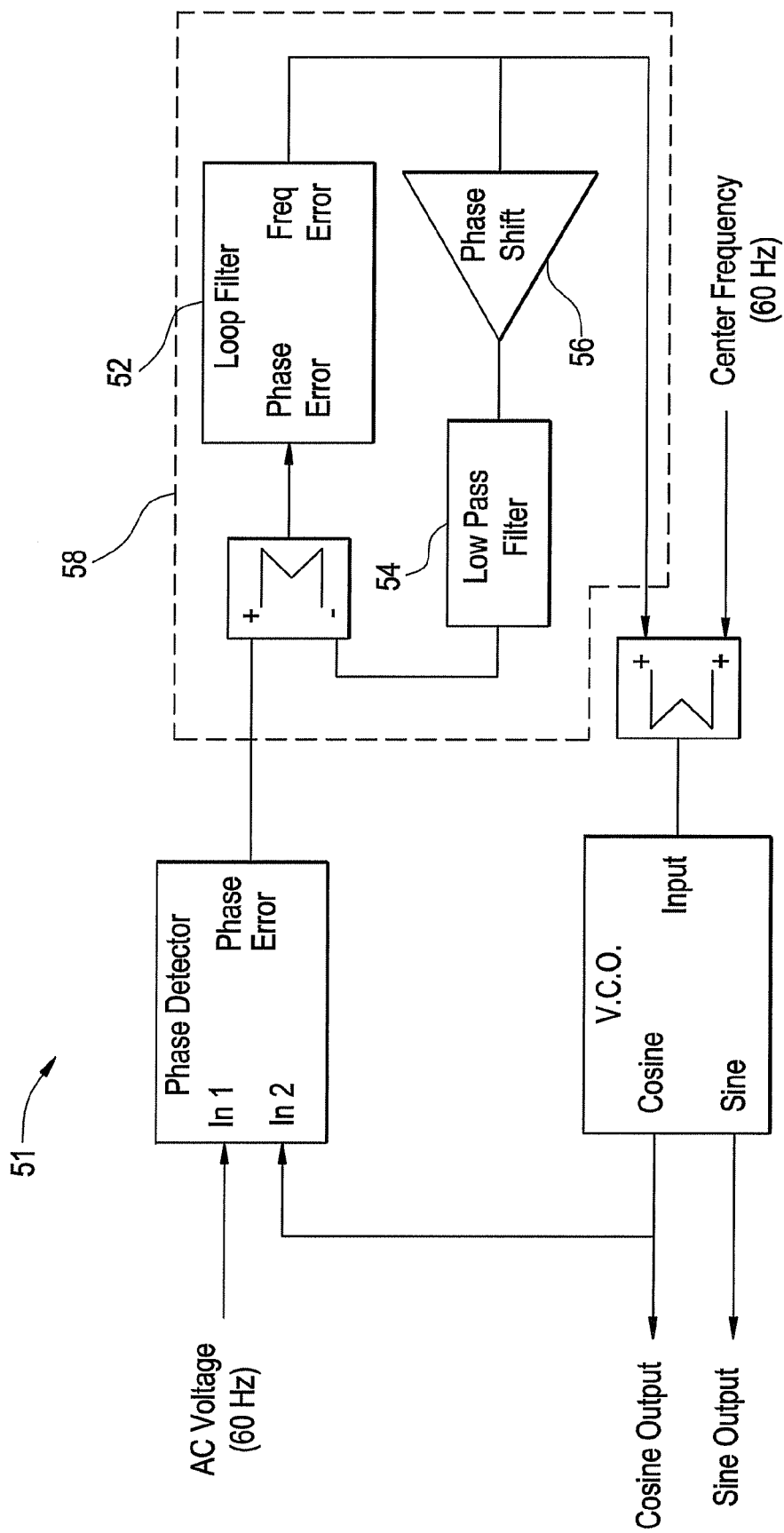
FIG. 7 is a schematic diagram of the PLL of the present invention with a low pass filter option.

An exemplary embodiment of the present invention will be described in reference to FIG. 7. In this embodiment, the PLL 51 includes a circuit 58. The circuit 58 includes a loop filter 52, phase shift 56, low pass filter 54 and summation circuit 55.

It should be appreciated that the components 52, 54, 55, 56 are illustrated as separate components for purposes of clarity, but preferably would be integrated into a single circuit. As will be made clearer herein below, the circuit 58 is shown merely for the purpose of clearly illustrating the changes to the low pass filter.

There are a number of options for the design of the loop filter 52. The low pass filter 54 choice a function of the loop filter 52 characteristics. Consider a simple first order PLL. In this embodiment, the loop filter 52 could be as simple as a gain and a single pole loop pass function. This is best described by a Laplace transform, $$T_1(s) = \frac{K_1}{1 + \frac{s}{\omega_1}}$$

where:
$T_1(s)$ is the transfer function of the prior art filter;
$K_1$ is the gain of that filter; and
$\omega_1$ is the corner frequency of the filter.

In general, one skilled in the art would typically choose the value of $\omega_1$ high enough to get keep system stable and low enough to filter the second harmonic of the operating frequency that will be output by most types of phase detectors. The gain $K_1$ is chosen to give the desired response time. Higher values yield faster response but require higher values of $\omega_1$ for stability.

The additional gain and low pass filter 58 of the exemplary embodiment can be described similarly as $$T_2(s) = \frac{K_2}{1 + \frac{s}{\omega_2}}$$

where:
$T_2(s)$ is the transfer function of the gain and the filter block added in the model;
$K_2$ is the gain of the phase shift block and is equivalent to the gain value;
$K_p$ is the phase shift gain in degrees or radians per Hz as described above; and
$\omega_2$ is the corner frequency of the low pass filter block.

The choice of $K_p$ is described herein above and the choice of the value for $\omega_2$ depends on intended performance and the other parameters as will be described herein below. In the preferred embodiment, the value of $\omega_2$ is much lower than $\omega_1$.

The transfer function of the gain and filter circuit 58 can be derived as follows:

$$T_f(s) = \frac{O(s)}{I(s)} = \frac{T_1(s) * (I(s) - T_2(s) * O(s))}{I(s)} = \frac{1}{\frac{1}{T_1(s)} + T_2(s)}$$

This is simply another type of low pass with a specific gain. The transfer function of this circuit 58 is shown below.

$$T_f(s) = \frac{K_1 \cdot \omega_1 \cdot (\omega_2 + s)}{(\omega_1 + s) \cdot (\omega_2 + s) + K_1 \cdot K_2 \cdot \omega_1 \cdot \omega_2}$$

In the above transfer function if s=0, then $$T_f(s) = \frac{K_1}{1 + K_1 \cdot K_2}.$$

In general there are two requirements of the low pass filter 54. The first the gain at DC (s=0) is the appropriate value to leave a small frequency and phase error. In the preferred embodiment, this value is in the range of 0.001 to 2 Hertz per degree, more preferably, the values are in the range of 0.003 to 0.03 Hertz per degree. As discussed above, the assumption is made that $K_1$ is large and so the filter gain is simply $1/K_2$.

The second requirement is that the PLL 51 have fast tracking and response time to step changes in phase. This is accomplished in the preferred embodiment by having higher gain in the loop filter at AC frequencies making the bandwidth of the PLL 51 greater. The curves shown in FIG. 5 illustrate that this higher gain occurs at about 100 radians per second.

The resulting PLL 51 of the exemplary embodiment would have a large phase error and slow frequency tracking and therefore be considered a poor design. However, when applied in the application shown in FIG. 6, these normally undesirable characteristics cause some very desirable system results, including: fast dynamics, very simple design and precise frequency droop control.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. An electrical power control system comprising:
a first inverter;
an electrical power grid;
a first inductive member connecting said first inverter to said electrical power grid; and,
a first inverter control system having a phase locked loop including a transfer function providing a predetermined phase shift between 0.5 to 500 degrees per Hz during nearly steady operation, whereby the input of said phase locked loop is a voltage on said electrical power grid side of said first inverter and the output of said phase locked loop is a sine wave corresponding to the desired fundamental value and phase at the output of said first inverter.

2. The electrical power control system of claim 1 wherein said transfer function is selected to provide a smaller phase shift when the output phase angle changes in less than 0.1 seconds and more than 0.1 milliseconds.

3. The electrical power control system of claim 1 wherein the phase locked loop is a first order phase locked loop.

4. The electrical power control system of claim 1 wherein the phased locked loop is a second order phase locked loop.

5. The electrical power control system of claim 4 further comprising a phase shift electrically connected to said phase locked loop and said low pass filter.

6. The electrical power control system of claim 5 further comprising a summation circuit electrically coupled to said low pass filter and a phase detector.

7. The electrical power control system of claim 1 further comprising: a second inverter electrically coupled to said electric power grid;
- a second inductive member connecting said second inverter to said electrical power grid; and,
- a second inverter control system having a phase locked loop including a transfer function providing a predetermined phase shift, whereby the input of said phase locked loop is a voltage on said electrical power grid side of said second inverter and the output of said phase locked loop is a sine wave corresponding to the desired fundamental value and phase at the output of said second inverter.

8. A phase lock loop comprising:
- a phase detector having at least one input voltage from an electrical grid and an output;
- a loop filter electrically having an input and an output, said loop filter being connected on said loop filter input to said phase detector output;
- a voltage controlled oscillator having an input and a first and second output, said voltage controlled oscillator input being electrically connected to said loop filter;
- a phase shift electrically connected to said loop filter output; and
- a low pass filter electrically connected to said phase shift and said loop filter.

9. The phase lock loop of claim 8 wherein said first voltage controlled oscillator output is a signal representing a sine wave form and said second voltage controlled oscillator output is a signal representative of a cosine wave form.

10. The phase lock loop of claim 9 wherein said second voltage controlled oscillator is electrically connected to a second input on said phase detector.

11. A method of controlling power output from a control system, comprising the steps of: receiving a signal representative of voltage from an electrical grid;
- receiving a signal representative of voltage from an inverter;
- obtaining a phase error signal that represents the difference between the inverter and electrical grid voltages;
- generating a frequency error signal that is a function of the phase error signal, wherein
- said phase error signal and frequency error signals are voltage signals; and,
- adjusting the phase error signal via a feedback loop that includes a phase shift and low pass filter of the frequency error signal; and,
- shifting the phase between 0.5 to 500 degrees per Hz during nearly steady operation.

12. The method of controlling power output from a control system of claim 11 comprising the step of adjusting the frequency of the inverter by the use of the frequency error signal.

13. The method of controlling power output from a control system of claim 12 comprising the step of filtering the phase shift signal from a phase-locked loop.

14. The method of controlling power output from a control system of claim 13 comprising the step of generating a filtered phase shifted signal and generating said frequency error signal as a function of said filtered phase shifted signal.

15. The method of controlling power output from a control system of claim 14 comprising the step of generating a sine output and a cosine signal from said filtered phase shifted signal.

16. The method of controlling power output from a control system of claim 15 comprising the step of receiving said sine and cosine signal in a control system.

17. The method of controlling power output from a control system of claim 16 comprising the step of altering the output of an inverter based on the sine and cosine signal.

* * * * *